United States Patent [19]

Charlin

[11] 3,964,752

[45] June 22, 1976

[54] METHODS AND DEVICES FOR RECORDING, ENGRAVING AND REPRODUCING MODULATED INFORMATION IN TETRAPHONY

[76] Inventor: André Marie Bernard Charlin, 119 Avenue Emile Zola, 75015 Paris, France

[22] Filed: Dec. 19, 1973

[21] Appl. No.: 426,116

[30] Foreign Application Priority Data

Dec. 19, 1972 France .............................. 72.45329

[52] U.S. Cl. ...................... 274/46 R; 179/100.4 ST; 179/1 GQ

[51] Int. Cl.² ............................................ G11B 3/04

[58] Field of Search ................ 179/100.4 ST, 1 GQ; 274/46 R

[56] References Cited

UNITED STATES PATENTS

| | | | |
|---|---|---|---|
| 2,977,424 | 3/1961 | Redlich | 179/100.4 ST |
| 3,075,052 | 1/1963 | Terry | 179/100.4 ST |
| 3,118,977 | 1/1964 | Olson | 179/100.4 ST |
| 3,223,789 | 12/1965 | Ooms | 274/46 R X |

*Primary Examiner*—Richard E. Aegerter
*Assistant Examiner*—MIchael H. Thaler

[57] ABSTRACT

A microgroove disk record for monophonic, stereophonic and tetraphonic reproduction of modulated information recorded on four separated tracks one of which corresponds to a left fore channel, another one to a right fore channel, another one to a left rear channel and another one to a right rear channel, comprising two adjacent parallel grooves one of which carries the tracks corresponding to the left fore and right fore channels and the other one carries the tracks corresponding to the left rear and right rear channels, the spacing between both channels being variable according to the modulation.

7 Claims, 7 Drawing Figures

Fig. 1.
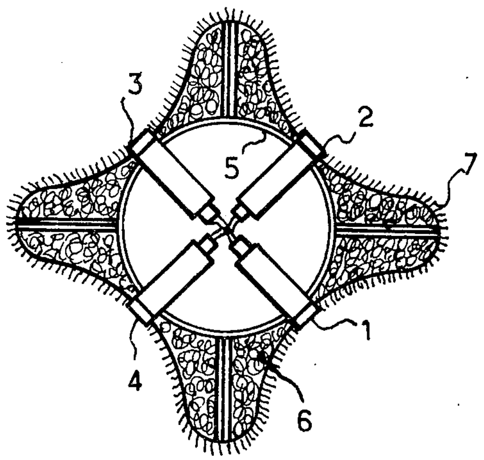
Fig. 3.
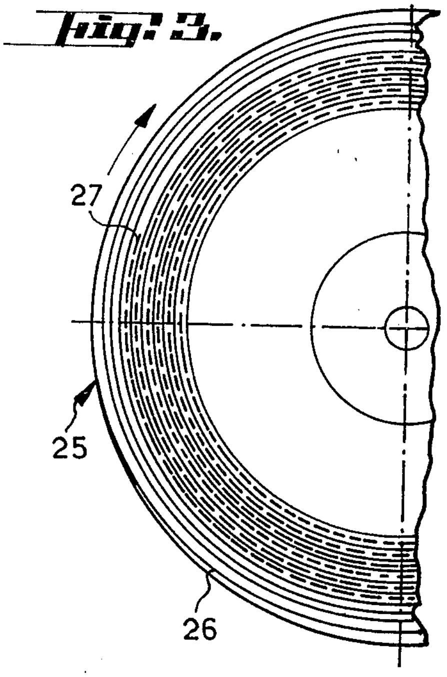
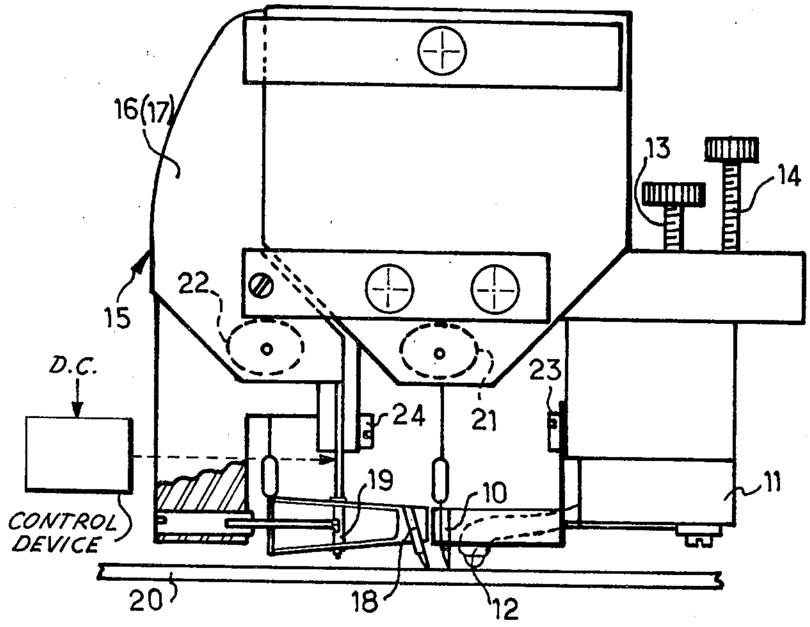
Fig. 2.
Fig. 4.
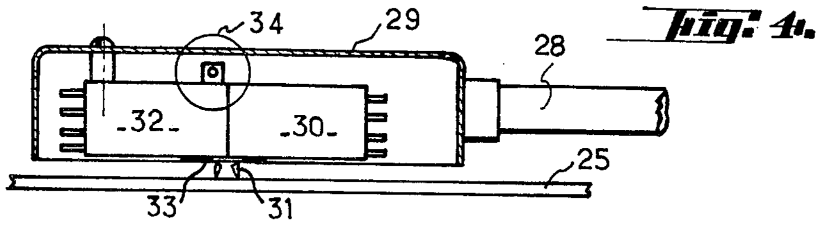

METHODS AND DEVICES FOR RECORDING, ENGRAVING AND REPRODUCING MODULATED INFORMATION IN TETRAPHONY

The present invention relates essentially to devices and processes or methods for recording, engraving or embossing and reproducing, playing back or reading out modulated information or data in tetraphony, such as music, providing play back, reproduction or read out in a simple manner from a microgroove disk record on which has been cut four tracks corresponding to separated left fore, right fore, left rear and right rear channels.

Two channel stereophonic recording is known in the prior art and attempts have been made for some time at attaining records usuable in the same way but including four separated channels capable of operating four loudspeakers arranged about listeners for restoring a normal 360° auditory field.

For this purpose the invention provides a process of engraving a microgroove disk record for recording modulated information or like data which are reproducible in tetraphony and previously recorded on four tracks of a magnetic tape, which process consists in engraving in a manner known per se a first groove comprising two separated tracks corresponding to a left fore or front channel and a right fore or front channel, respectively, simultaneously engraving a second groove substantially parallel and adjacent to the first one and comprising two separated tracks corresponding to a left rear or back channel and a right rear or back channel, respectively, and varying the spacing between both grooves in accordance with the amplitude of modulation of the information.

Thus, according to the invention the method consists in cutting simultaneously into a disk a pair of adjacent stereophonic grooves each one comprising a pair of modulated information recording tracks. The engraving is therefore carried out as a double stereophonic engraving and avoids all the drawbacks of cutting four separated channels into a same groove of a disk.

The invention also relates to a device for playing back, reproducing or reading out a microgroove disk record comprising a pair of substantially parallel adjacent spiral or helical grooves each one carrying a pair of tracks for recording modulated information which are reproducible in monophony, diphony and tetraphony, the device comprising drive means for rotating the disk record about its axis, a reproducing head or pick-up carried by an arm or like holder of a kind known per se and including a pair of monophonic or stereophonic pick-up styluses, means for placing a first stylus into the first groove and means for placing the second stylus into the second groove shortly after the beginning of embossing the first groove.

Thus the play back of a microgroove disk record comprising four separated tracks is carried out according to the invention by means of a reproducing head or pick-up fitted with a pair of separated pick-up styluses each one connected to a pair of channels of known means for amplifying and reproducing or recovering modulated information.

The invention relates further to a microgroove disk record for monophonic, stereophonic and tetraphonic reproduction of modulated information recorded on four separated tracks one of which corresponds to a left fore or front channel, another one to a right fore or front channel, another one to a left rear or back channel and another one to a right rear or back channel, the disk including a pair of substantially parallel adjacent grooves one of which carries the tracks corresponding for instance to the left fore or front and to the right fore or front channels whereas the other one carries the tracks corresponding to the left rear or back and to the right rear or back channels, the spacing between both grooves being variable in accordance with the modulation.

Owing to the latter feature according to which the spacing between both adjacent grooves is varied according to the modulation amplitude, the disk record obtained provides a duration of listening which is significantly above half of that of a normal stereophonic disk record and which is quite long enough with respect to the longest movements of a symphony.

The invention also relates to a microphonic assembly for recording on four separated tracks of a magnetic tape modulated information which are reproducible in tetraphony, comprising four microphones mounted in a rigid damped casing, housing or frame and directed in a same plane along four two by two perpendicular directions, a first absorbing lining or coating externally covering said casing and substantially forming a star with four limbs and a porous second lining or coating externally surrounding said first lining, said casing and both aforesaid linings having corresponding holes through which the heads of said microphones extend outwards to the outside.

It is thus possible to place this microphonic assembly according to the invention at the position of the most favoured listener and thereby to record on four separated channels the sounds reaching the four microphones in order to restore upon reproducing or playing back the information a normal 360° auditory field by means of four loud-speakers arranged about the listener.

The invention will be better understood and further objects, characterizing features and advantages thereof will appear more clearly as the following explanatory description proceeds with reference to the accompanying drawings given by way of example only and wherein:

FIG. 1 is a cross-sectional view of a microphonic recording assembly according to the invention;

FIG. 2 is a front view with parts broken away, showing means for tetraphonic engraving according to the invention;

FIG. 3 is a half view of a tetraphonic disk record according to the invention;

FIG. 4 is a view showing a tetraphonic reproducing head or pick-up according to the invention;

Figure 5:
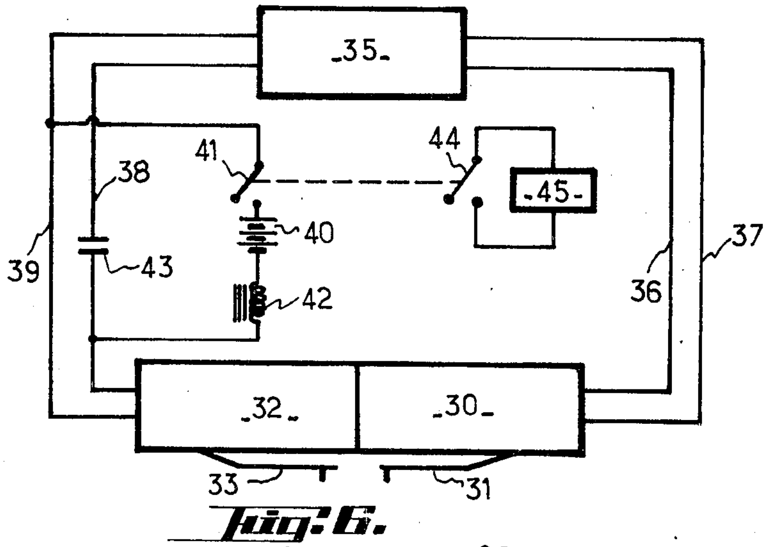
FIG. 5 shows the control means for operating the pick-up according to the invention.

In FIG. 1 has accordingly been shown a microphonic assembly for recording modulated information on four separated tracks of a magnetic tape. This recording assembly is derived from the device described in the French patent specification No. 1,375,245 and comprises four microphones 1, 2, 3, 4, respectively, which are fitted into a rigid and quite damped metal frame, casing or like holder 5 along four perpendicular directions. An absorbing lining 6 which may consist of vegetable or mineral fibers covers the whole of the casing 5 so as to avoid any parasitic reflections likely to produce stationary or standing waves on the microphones. An outer porous lining 7 which may desirably consist of a kind of artificial fur surrounds or is wrapped about the assembly and avoids any harmful reflection at the surface of the assembly. For recording purposes the microphonic assembly is placed in the best possible conditions at the position of the most favoured listener for collecting the impressions this listener would have received and which are to be reproduced within a listening room through the medium of four loud-speakers.

Each microphone 1, 2, 3, 4 is connected to a corresponding track or a recording magnetic tape. The four microphones of this assembly are substantially in phase for frequencies below 250 Hz.

The magnetic tape, which comprises four separated tracks for recording modulated information is then used for engraving or embossing a microgroove disk record by means of the device shown in FIG. 2.

This engraving device is derived from an engraving device of a known kind which includes a first engraving cutter or recording stylus 10 and its drive means such as an electromagnet 11 for controlling variable depth, a so-called "advance ball" device 12 and knurled knobs 13 and 14 for adjusting the maximum depth and minimum depth of the engraving.

The cutting stylus 10 would for instance be used for engraving tracks corresponding to the left and right fore or front channels, respectively.

According to the invention there is secured on this known engraving device a second cutting element 15 forming the cutting head for engraving tracks corresponding to the left and right rear or back channels, respectively. This member 15 consists of a pair of uprights 16 and 17 made from soft iron and which are adhering through the magnetic field onto the front portions of the pole pieces of the first engraving device and which supply a part of the magnetic field to a pair of movable engraving systems substantially identical with those used in the first engraving device. The element 15 comprises in particular a second cutting stylus 18 and variable depth and pitch control means, this second cutting stylus 18 being pivotally mounted about a shaft or pin 19 so that it may be moved as close as possible to the cutting stylus 10 of the first device.

Figure 7:
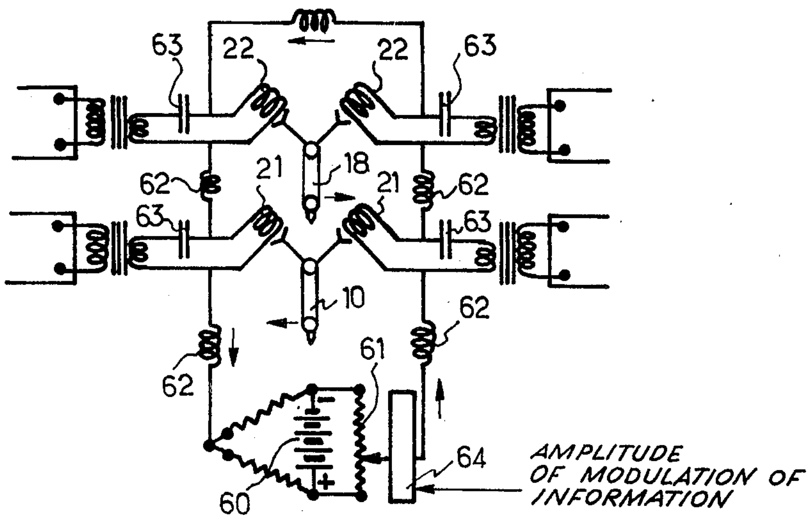
FIG. 7 diagrammatically shows the control means for adjusting the distance or spacing between both recording cutters or engraving styluses of the device shown in FIG. 2.

The second cutting stylus 18 is therefore offset with respect to the first cutting stylus 10 at first in the direction extending parallel with the radius of the disk 20 while being located to the right or to the left of the axis of the groove traced by the first cutting stylus 10 and at a distance which may be constant but which is long enough to avoid any overlapping of both grooves even under the largest cutting amplitudes. This distance may advantageously be rendered variable in accordance with the amplitude of the engraving to increase the duration of the disk as much as possible by means of the device which is shown in FIG. 7. The second cutting stylus 18 is also offset with respect to the first cutting stylus 10 in the direction extending at right angles to the radius of the disk, i.e. substantially in tangential relation to the grooves and it is offset ahead of the space required for preventing both cutting styluses from contacting each other. Such an offset results in a phase shift of the signals recorded on a same radius of the disk, the phase of the first cutting stylus 10 being then offset to lag or to be delayed with respect to that of the second cutting stylus 18 which is leading.

It is seen in FIG. 2 that the first cutting stylus 10 is mounted as usual straight below the moving coils 21 whereas the second cutting stylus 18 since it is mounted in rocking relationship about the pivot 19 will be actuated by the moving coils 22 in which the direction of electrical current will be reversed.

A micrometer screw system 23, 24 is provided for adjusting the normal spacing between the grooves cut by the cutting styluses 10 and 18.

In FIG. 3 there is shown a microgroove disk 25 obtained by the engraving process to the invention. This disk 25 comprises a first spiral or helical groove 26 which starts from the radially outer edge or rim of the disk 26 and which is helically or spirally winding on the disk to some distance from the centre thereof. A second groove 27 is cut in parallel adjacent relation to the first groove 26 so as to be located between two successive convolutions of this groove 26. Advantageously and for a ground which will be explained later more in detail the second groove 27 starts at some small distance from the outer edge or rim of the disk 25.

The reproducing head or pick-up according to the invention, enabling the play back or reading of the information engraved onto the disk 25 according to the invention is shown by way of example in FIG. 4 and is carried by an arm 28 or like holder of a kind known per se, mounted on a turntable. The pick-up 29 comprises a first pick-up cell 30 including a stylus 31 of conventional design and which is adapted to be placed into the first groove 26 of the disk 25. A second pick-up cell 32 is placed within the head or pick-up 29 adjacent to the pick-up cell 30 and comprises a pick-up stylus 33 of known construction which is adapted to be placed into the second groove 27 cut on the disk 25. An adjusting screw 34 enables to adjust the main or average spacing between both styluses 31 and 33 which are positioned so as to take up or compensate for the phase shift produced upon engraving.

The pick-up 29 further comprises a self-acting lifting device for the second pick-up stylus 33 enabling to automatically raise same through a very short distance off and above the surface of the disk 25. The pick-up cells 30 and 32 are connected in the usual manner to an amplifying circuit 35 through lead wires 36, 37 and 38, 39, respectively. The device for lifting and lowering the second stylus 33 from and onto the surface of the disk 25 comprises a source 40 of electrical direct current connected in series to a terminal of a switch 41 the other terminal of which is connected to the lead wire 39. An inductor coil 42 is mounted between the lead wire 38 and the other output of the source 40 of direct current. A capacitor 43 is mounted in series on the lead wire 38 between the amplifying means 35 and the coil 42.

Desirably the switch 41 may be connected to another switch 44 which controls by means of a device 45 the placing of the first stylus 31 into the first groove 26 by lowering of the arm 28.

It is thus apparent that when the switch 44 is closed the arm 28 is allowed in a manner known per se to move down onto the disk 25 and the stylus 31 moves into the first groove 26. The closing of the switch 44 causes the switch 41 to be closed and electrical direct current flows through the second pick-up cell 32 and causes the second stylus 33 to be lifted off. The capacitor 43 prevents the electrical direct current supplied by the source 40 from feeding the amplifying means 35.

When the switch 44 is opened again the arm 28 remains in the lowered position, the first stylus 31 being positioned in the first groove 26 and the switch 41 is open so that the direct current from the source 40 does no longer feed the second pick-up cell 32 and the stylus 33 moves down again onto the surface of the disk 25.

Figure 6:
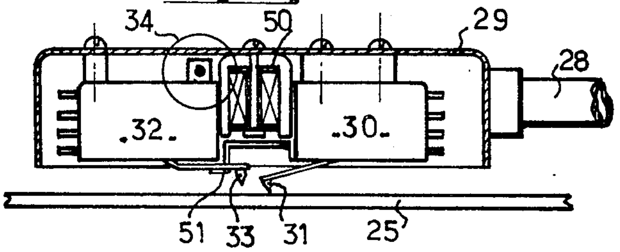
FIG. 6 illustrates an alternative embodiment of the control means for operating the pick-up according to the invention.

In the case where it is not possible to have a direct current flowing through the coils of the second pick-up cell 32 for raising or lifting off the second stylus 33 it is advantageous to use the device shown in FIG. 6 which comprises an electromagnet 50 carried by the pick-up 29. The flow of current through this electromagnet 50 acts upon a small bracket or yoke 51 which extends under the second pick-up stylus 33 and which therefore lifts the latter off. When the electromagnet 50 is no longer energized, the yoke 51 allows the second pick-up stylus 33 to move again down onto the surface of the disk 25.

The recording, engraving and play back of a tetraphonic disk record according to the invention are therefore carried out in the following manner:

The microphonic recording assembly comprising the four microphones 1, 2, 3, 4 shown in FIG. 1 allows the recording of modulated information on four tracks of a magnetic tape corresponding each one to one of the left fore, the right fore, the left rear and the right rear channels which are desired to be provided. Starting from this magnetic tape it is possible to engrave by means of the device shown in FIG. 2, a disk 25 comprising two separated substantially parallel and adjacent grooves 26 and 27 the first groove 26 extending from the edge or rim of the disk 25 in a manner known per se whereas the second groove 27 is beginning some time after the first groove 26.

The play back of the disk 25 is carried out by means of the pick-up 29 shown in FIGS. 4, 5 and 6 and the placing of which onto the disk is effected in the following manner: the pick-up 29 is brought above the edge or rim of the disk 25 in the usual manner and the downward motion of the arm 28 is operated to cause the first pick-up stylus 31 to enter the beginning of the first groove 26. The second pick-up stylus 33 is then lifted upwards by the devices shown in FIG. 5 or 6 and it moves down onto the surface of the disk 25 only when the operation of the downward motion of the arm 28 towards the disk 25 is released. The second pick-up stylus 33 bears then onto the surface of the disk 25 and automatically engages the second groove 27 owing to the fact that the spacing between the styluses 31 and 33 is adjusted to match substantially the mean spacing between the grooves 26 and 27.

The outset of engraving the second groove 27 may advantageously take place right before the start of the modulation in the first groove 26; thus, when the user who has laid or set the first pick-up stylus 31 into the first groove 26 is beginning to hear the normal noise of the first stylus having dropped into the groove, he releases the operation of the downward motion of the arm 28 and accordingly causes the second pick-up stylus 33 to engage the second groove 27 without any possible risk of mistake.

When both grooves 26 and 27 have been cut into the disk 25 with a substantially constant spacing the duration of listening to the disk 25 will be reduced approximately by half with respect to that of a normal stereophonic disk. In order to increase the duration of listening to this tetraphonic disk the invention contemplates to vary the spacing between the grooves 26 and 27 in accordance with the amplitude of the modulation of the recorded information so that it is possible to provide a tetraphonic disk the duration of listening to which is significantly higher than one half of that of a normal stereophonic disk. The device used for this purpose is shown in FIG. 7 and comprises a Wheatstone bridge including a variable resistor 61 and a source of electrical direct current 60. Both outputs of the Wheatstone bridge are connected through inductor coils to the circuit of the moving drive coils 21 and 22 for operating the cutting styluses 10 and 18 of the engraving device and the variable resistor 61 is operated by a device 64 which is sensitive to the amplitude of the modulation of information. This direct current circuit is isolated from the modulation circuit of coils 21 and 22 by the inductor coils 62 and by the capacitors 63 having suitable values. The electrical direct current flows through the moving coils 21 and 22 connected in series so as to generate the same field circulation or ampere-turns in each one of these coils and the control is carried out by the device 64 and the variable resistor 61 in order that the electrical direct current be zero for the mean or average pitch, that it be largest in one direction for the small pitch and that it be smallest but in the reverse direction for the large pitch. For this purpose the direction of the electrical direct current in the circuit should conform to that shown by the arrows in FIG. 7 to produce the deviation or excursion of the cutting styluses in the direction shown. Under such conditions the largest current magnitude required is very reduced in each one of the coils 22 for achieving the deviations of the grooves. It should also be noted that a control device operated by electrical direct current may be used to lift the second cutting stylus 18 of the engraving device of FIG. 2 at the beginning of the disk being engraved by the first cutting stylus 10 in order to have the second groove 27 started shortly after the beginning of the first groove 26.

It is thus understood that the engraving and play back of a tetraphonic disc record according to the invention do not give rise to any manipulation problem. Moreover the tetraphonic reproduction is quite good because of the provision of two separated stereophonic grooves and the signal-to-background noise ratio is significantly improved since four tracks are listened to at a time thereby enabling the use of a finer engraving for making the disk.

It should be understood that the invention is not at all limited to the forms of embodiment described and shown which have been given by way of example only. In particular it comprises all the means constituting technical equivalents of those described as well as their combinations if the latter are carried out according to the gist of the invention and used within the scope of the appended claims.

What is claimed is:

1. A method of engraving a microgroove disk for recording modulated information such as music which may be reproduced in tetraphony and previously recorded on four tracks of a magnetic tape, comprising the steps of engraving a first groove including two separated tracks corresponding to a left front channel and a right front channel, respectively; simultaneously engraving a second groove to extend in substantially parallel and adjacent relation to the first one and including two separated tracks corresponding to a left rear channel and a right rear channel, respectively; and simultaneously with the engraving of the first groove and the engraving of the second groove varying the spacing between the first and second grooves being engraved in accordance with the amplitude of the modulation of information, the spacing being varied greater than and less than a predetermined mean spacing between the first and second grooves.

2. A method according to claim 1, consisting in engraving the second groove radially inwards of said disk with respect to said first groove.

3. The method of claim 1, wherein the engraving of the second groove is begun shortly after the engraving of the first groove is begun.

4. In a microgroove disk engraving apparatus for recording stereophonic signals wherein a first stereophonic recording stylus and first coils are controlled by two first information signals, the improvement comprising the attachment thereto of a second stereophonic recording stylus and second coils controlled by two second information signals, and means for varying the spacing between said first and second recording styluses comprising, means for generating a direct current signal proportional to the amplitude of said information being recorded, and means for applying said direct current signal to said first and second coils, this direct current signal causing the spacing between the first and second recording styluses to vary as a function of the direct current signal.

5. A device for tetraphonically engraving a microgroove disk with information from four separate sources of electrical information signals, the signals varying at least in response to the magnitude of the information, the device comprising first means for cutting a groove in the disk including a first sterophonic recording stylus, first drive coils for operating the stylus in response to electrical information signals from the two of the sources, the operating of the first stylus including movement thereof transversely with respect to the length of the first groove, and first means for adjusting the depth of the first groove, second means for simultaneously cutting a second groove adjacent and parallel to the first groove in the disk including a second sterophonic recording stylus positioned at a predetermined mean distance from the first stylus in a direction transverse to the length of the grooves, second drive coils for operating the stylus in response to electrical information signals from the remaining two sources, the operating of the second stylus including movement thereof transversely with respect to the length of the second groove, and second means for adjusting the depth of the second groove, means for sensing the amplitude of the information represented by the electrical information signals, and means for varying the distance between the first stylus and the second stylus as a function of the amplitude of the information being sensed by the sensing means, the distance being varied greater and less than the predetermined mean distance between the first stylus and the second stylus.

6. The device of claim 5, wherein said means for varying the predetermined distance between said first and second recording styluses comprises, means for generating a direct current signal proportional to the amplitude of said information being recorded, and means for applying said signal to said first and second coils.

7. The device of claim 6, wherein said means for generating a direct-current signal proportional to the amplitude of said information being recorded comprises a bridge arrangement having two fixed resistors connected at a common terminal and a direct-current voltage source connected between the other terminals of said fixed resistors and a potentiometer connected in parallel with said direct-current voltage source, and means for operating the wiper element to move in proportion to the amplitude of said signals to be recorded.

* * * * *

UNITED STATES PATENT AND TRADEMARK OFFICE

CERTIFICATE OF CORRECTION

PATENT NO. : 3,964,752

DATED : June 22, 1976

INVENTOR(S) : Andre Marie Bernard Charlin

It is certified that error appears in the above-identified patent and that said Letters Patent are hereby corrected as shown below:

Col. 1, line 16, "usuable" should be --usable--.

Col. 4, line 13 after "process" insert --according--.

Col. 7, line 39 after "a" and before "grove" insert --first--

Signed and Sealed this

Fifth Day of October 1976

[SEAL]

*Attest:*

RUTH C. MASON
*Attesting Officer*

C. MARSHALL DANN
*Commissioner of Patents and Trademarks*